(12) United States Patent
Bender (10) Patent No.: US 7,878,191 B2
(45) Date of Patent: Feb. 1, 2011

(54) SOLAR COLLECTOR STABILIZED BY CABLES AND A COMPRESSION ELEMENT

(76) Inventor: William H. Bender, 1190 Turnpike Rd., Norwich, VT (US) 05055

( * ) Notice: Subject to any disclaimer, the term of this patent is extended or adjusted under 35 U.S.C. 154(b) by 353 days.

(21) Appl. No.: 11/981,457

(22) Filed: Oct. 31, 2007

(65) Prior Publication Data

US 2009/0107542 A1 Apr. 30, 2009

(51) Int. Cl.
*F24J 2/10* (2006.01)
(52) U.S. Cl. .................. 126/696; 343/874
(58) Field of Classification Search .......... 126/696; 343/874
See application file for complete search history.

(56) References Cited

U.S. PATENT DOCUMENTS

| | | | | |
|---|---|---|---|---|
| 2,762,069 A * | 9/1956 | Laycock | ................... | 14/2.4 |
| 2,939,554 A * | 6/1960 | Bolton et al. | ................... | 52/650.3 |
| 3,063,521 A * | 11/1962 | Fuller | ................... | 52/646 |
| 3,105,969 A * | 10/1963 | Banche et al. | ................... | 343/915 |
| 3,139,957 A * | 7/1964 | Fuller | ................... | 52/83 |
| 3,312,020 A * | 4/1967 | Schuster | ................... | 52/108 |
| 3,354,591 A * | 11/1967 | Fuller | ................... | 52/81.2 |
| 3,406,404 A * | 10/1968 | Maier | ................... | 343/915 |
| 3,496,687 A * | 2/1970 | Greenberg et al. | ................... | 52/109 |
| 3,509,576 A * | 4/1970 | McLain | ................... | 343/840 |
| 3,525,483 A * | 8/1970 | Van Alstyne | ................... | 244/172.6 |
| 3,550,140 A * | 12/1970 | Werner | ................... | 343/766 |
| 3,553,701 A * | 1/1971 | Thomas | ................... | 343/766 |
| 3,558,219 A * | 1/1971 | Buckingham et al. | ................... | 359/851 |
| 3,744,191 A * | 7/1973 | Bird | ................... | 52/2.23 |
| 3,773,061 A * | 11/1973 | Berger | ................... | 135/121 |
| 3,837,924 A * | 9/1974 | Baron | ................... | 136/244 |
| 3,843,238 A * | 10/1974 | Rushing et al. | ................... | 359/847 |
| 4,106,244 A * | 8/1978 | Kessler et al. | ................... | 52/63 |
| 4,156,997 A * | 6/1979 | Decker et al. | ................... | 52/223.6 |
| 4,161,942 A * | 7/1979 | Monk | ................... | 126/576 |
| 4,207,715 A * | 6/1980 | Kitrick | ................... | 52/81.4 |
| 4,275,537 A * | 6/1981 | Pinson | ................... | 52/223.8 |
| 4,295,621 A | 10/1981 | Siryj | | |
| 4,378,560 A * | 3/1983 | Khorsand | ................... | 343/912 |
| 4,383,520 A | 5/1983 | Huebl et al. | | |
| 4,425,904 A | 1/1984 | Butler | | |

(Continued)

OTHER PUBLICATIONS

International Search Report with Written Opinion, dated Jan. 29, 2009, in international patent application No. PCT/US08/081937, 9 pgs.

(Continued)

*Primary Examiner*—Kenneth B Rinehart
*Assistant Examiner*—Jorge Pereiro
(74) *Attorney, Agent, or Firm*—Holland & Knight LLP; Brian J Colandreo, Esq.; V. Raman Bharatula, Esq.

(57) ABSTRACT

A solar collector system including solar elements connected to form an array for intercepting the sun's radiation, a compression element that is positioned substantially perpendicular to the array, and pairs of cables that run from opposite sides of the array to the compression element to mutually stabilize each portion of the array to which the pair of cables connects. A support structure is provided for securing the array to a fixed structure. A tracking system further provides the system with two degrees of freedom for tracking the array with the sun's movement.

25 Claims, 11 Drawing Sheets

U.S. PATENT DOCUMENTS

| | | | |
|---|---|---|---|
| 4,585,318 A | 4/1986 | Seifert | |
| 4,711,062 A * | 12/1987 | Gwilliam et al. | 52/646 |
| 4,887,589 A | 12/1989 | Frohardt et al. | |
| 4,890,599 A | 1/1990 | Eiden | |
| 4,995,377 A | 2/1991 | Eiden | |
| 4,999,059 A | 3/1991 | Bagno | |
| 5,058,334 A * | 10/1991 | Yamada et al. | 52/80.1 |
| 5,162,811 A * | 11/1992 | Lammers et al. | 343/915 |
| 5,237,337 A * | 8/1993 | Hutchison et al. | 343/840 |
| 5,325,844 A | 7/1994 | Rogers et al. | |
| 5,421,376 A * | 6/1995 | Sinha | 139/419 |
| 6,003,269 A * | 12/1999 | McRee | 52/6 |
| 6,226,121 B1 * | 5/2001 | Atkinson et al. | 359/399 |
| 6,563,040 B2 | 5/2003 | Hayden et al. | |
| 6,631,603 B2 * | 10/2003 | Zornes | 52/782.1 |
| 6,964,488 B2 * | 11/2005 | Harrison | 359/871 |
| 7,285,719 B2 * | 10/2007 | Conger | 136/245 |
| 7,567,218 B2 * | 7/2009 | Whelan | 343/912 |
| 2004/0105176 A1 * | 6/2004 | Harrison | 359/853 |
| 2004/0238025 A1 | 12/2004 | Shingleton | |
| 2004/0239136 A1 * | 12/2004 | Nolle | 296/37.8 |
| 2005/0035244 A1 * | 2/2005 | Conger | 248/49 |
| 2005/0103328 A1 | 5/2005 | Niedermeyer | |

OTHER PUBLICATIONS

International Preliminary Report on Patentability, dated May 14, 2010, in international patent application No. PCT/US08/081937, 8 pgs.

* cited by examiner

SOLAR COLLECTOR STABILIZED BY CABLES AND A COMPRESSION ELEMENT

FIELD OF THE INVENTION

This invention relates generally to a solar collector. In particular, the present invention is directed to a light-weight, highly-stable solar collector that incorporates cables and a compression element to support and stabilize solar elements.

BACKGROUND OF THE INVENTION

Solar collector systems are generally characterized by having large surface areas to collect solar radiation. The large collecting surface area is usually made up of a group of sub-components connected together and supported to create the larger surface area. Collector systems are designed to either directly collect the sun's electromagnetic energy, such as photovoltaic array systems, or to reflect the energy to a receiving element, such as with heliostats or parabolic concentrators. To improve the efficiency of these systems, many solar collectors track with the sun. These systems either directly track to the sun, such as a solar parabolic dish concentrator which must face the sun, or these systems follow a different path in order to reflect the electromagnetic radiation to a particular location, such as a heliostat. Tracking usually requires the collector system have two rotational degrees of freedom, e.g. altitude and azimuth.

Figure 1:
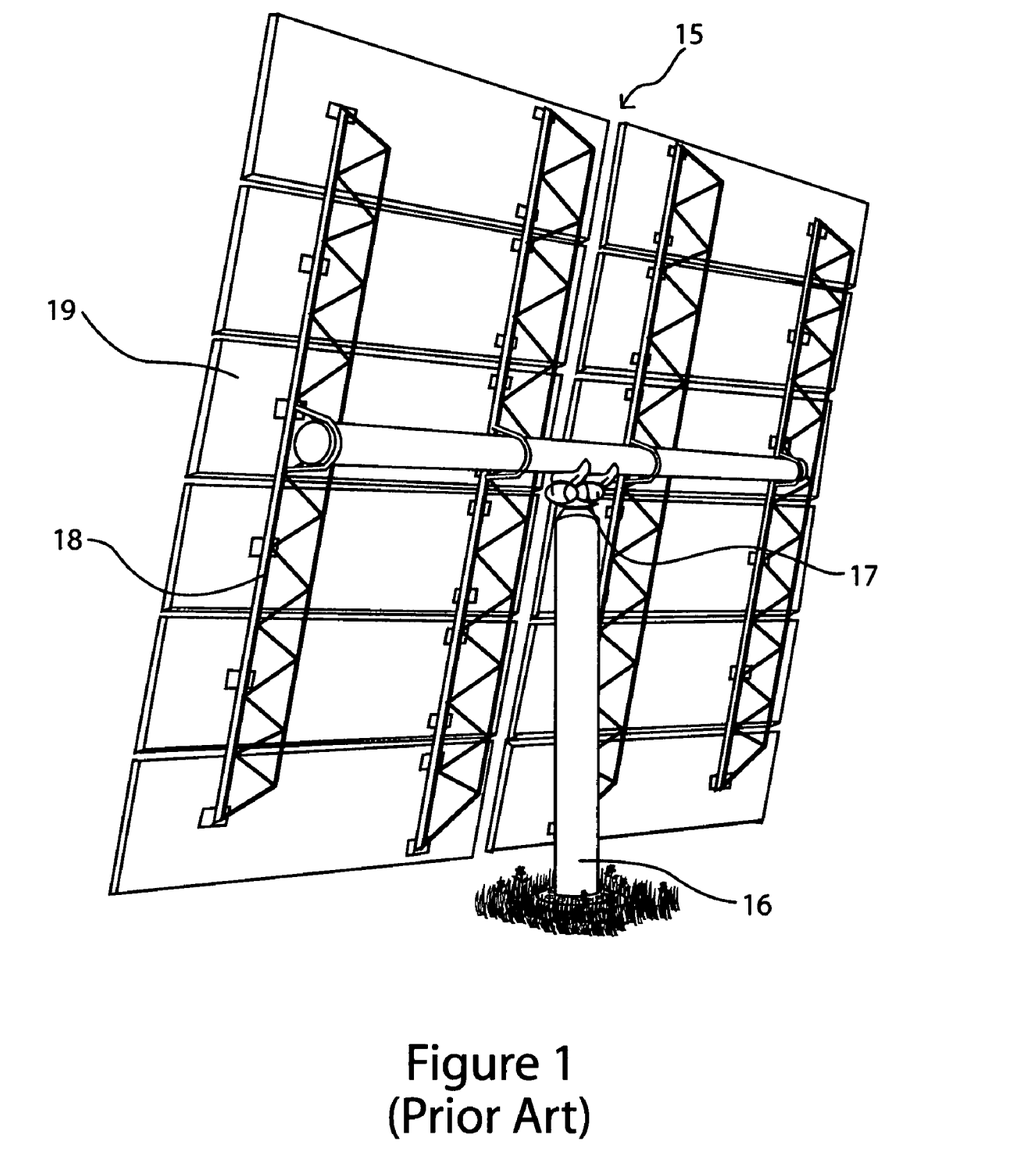
FIG. 1 is a perspective view of a prior art structure of a heliostat.
Figure 2:
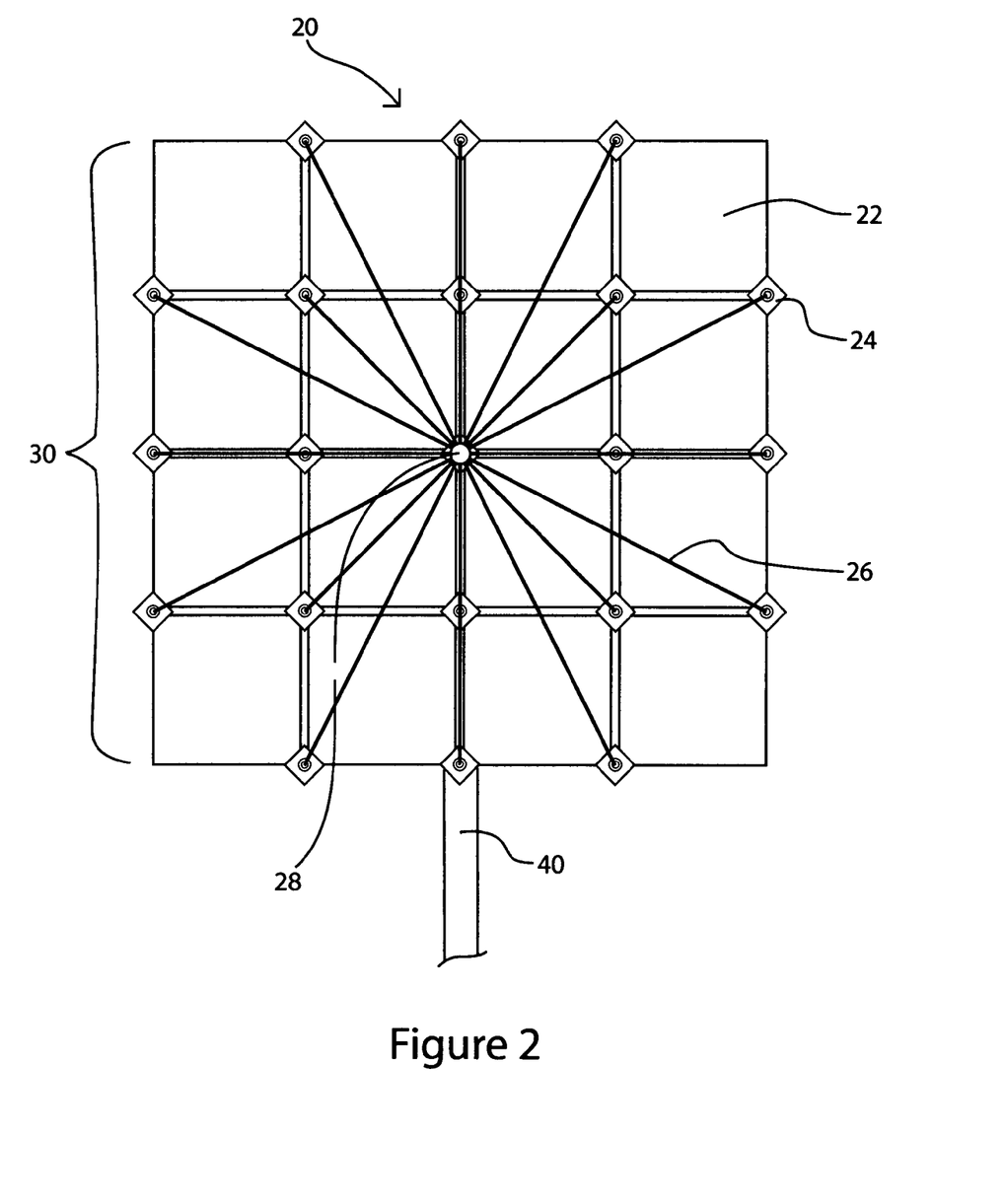
FIG. 2 is a front perspective view of a solar collector according to the present invention, wherein solar elements are connected together using connectors, cables and a compression element to form an array of solar elements for intercepting the sun's radiation.
Figure 3:
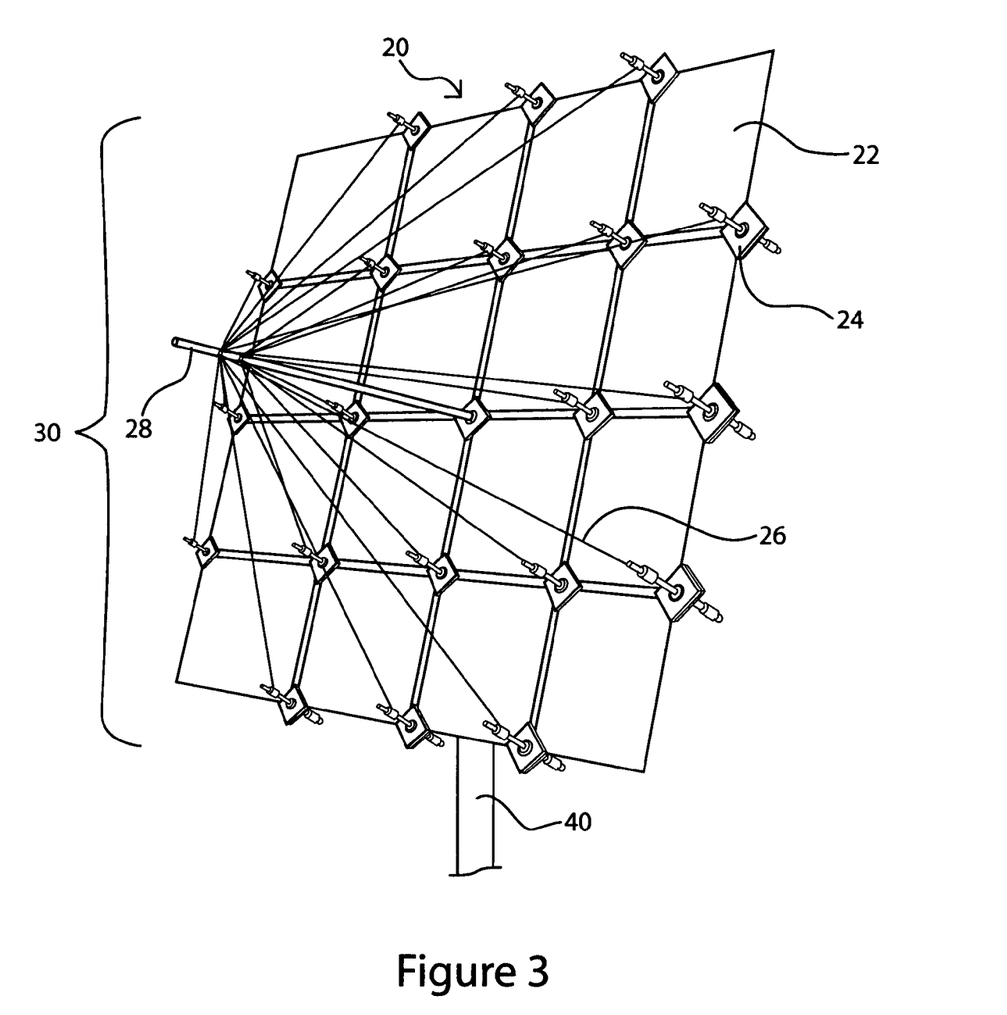
FIG. 3 is a perspective view of the front and side of the solar collector in FIG. 2.
Figure 4:
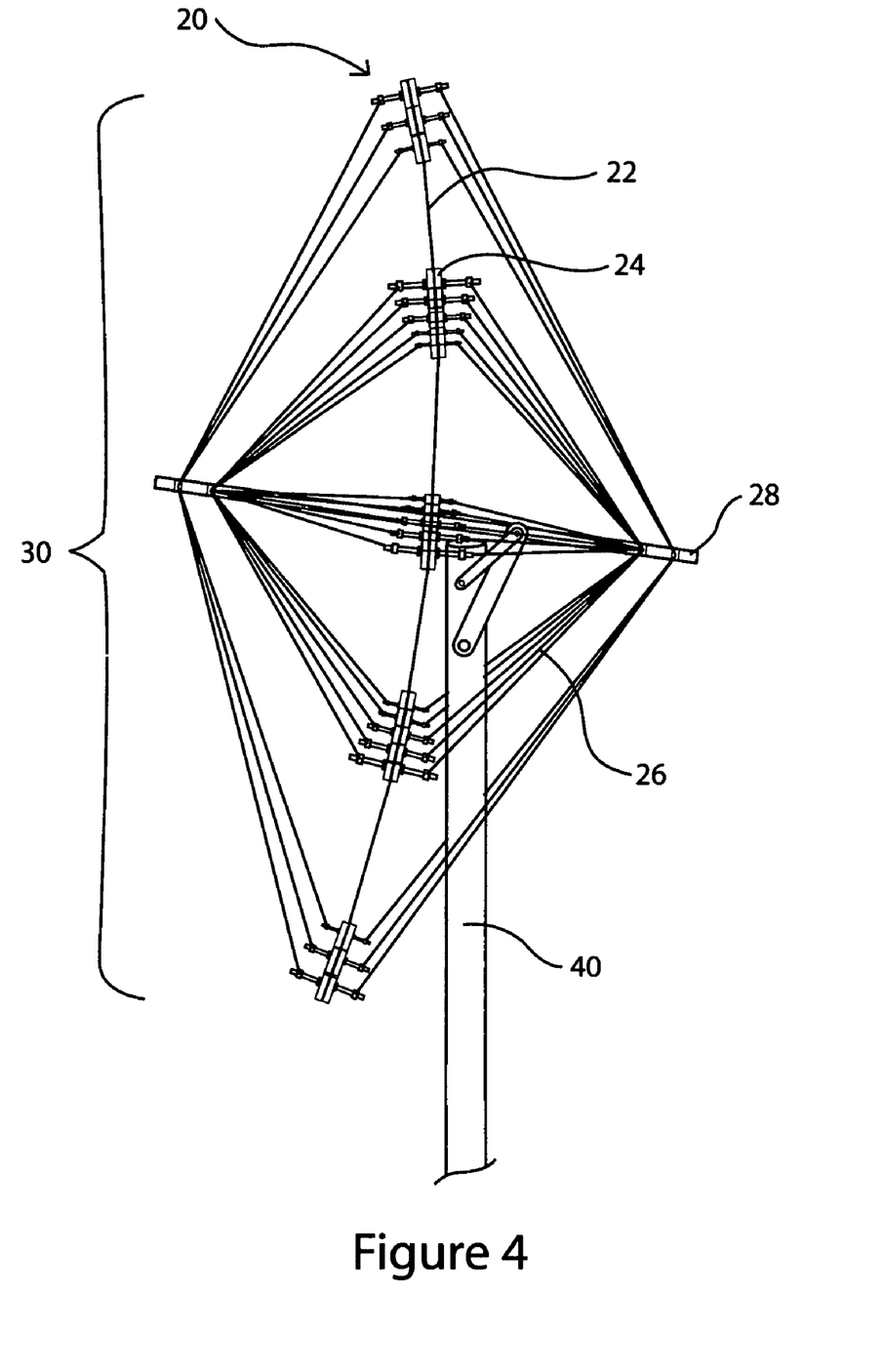
FIG. 4 is a schematic, side perspective view of the solar collector in FIG. 2.
Figure 5:
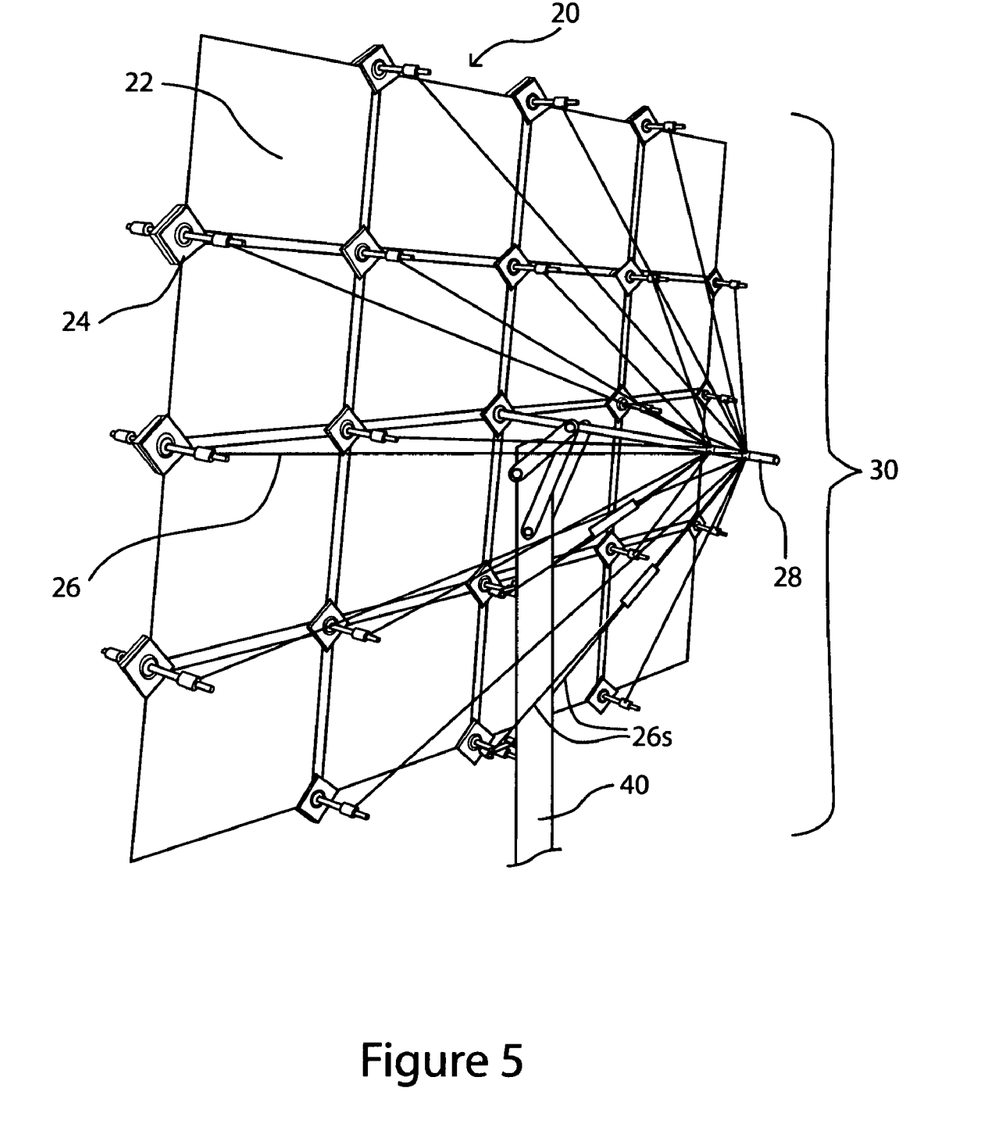
FIG. 5 is a perspective view of the back and side of the solar collector in FIG. 2.

From a design perspective, one of the most critical features of solar collector systems is to have a large surface area for the collector. However, when exposed to environmental elements, these large surface areas create many design problems. Of particular importance are the loads imposed upon the structure due to extreme weather, primarily high winds. To accommodate these high-wind loads, large and heavy structures are incorporated into the design to support the solar elements. A common design for a prior art solar collector system 15 is shown in FIG. 1. System 15 consists of a base or mounting pedestal 16 upon which the remaining components are mounted. These components include a drive system 17, support elements 18 upon which individual solar components 19 are mounted, and the individual collecting or reflecting solar components.

While this prior art has been around for decades, to date these systems have been very heavy and expensive to manufacture and install. Their cost and bulkiness has limited their widespread use and acceptance for solar collector systems. The first problem is that these systems contain heavy structural elements to support and stabilize the system in high winds, which contributes to the overall initial high cost of implementing a system. The second problem is that the drive system and other auxiliary components must also be large and powerful to effectively deal with the weight and inertia of the bulky system. The associated large and powerful motors make it difficult to provide fine positional control and motion of the entire structure.

Accordingly, there remains a continuing need to provide solar collector systems which are light weight, stable, easy to manufacture, simple to assemble, inexpensive and can withstand high winds.

SUMMARY OF THE INVENTION

One aspect of the present invention is directed to a solar collector comprising solar elements connected to form an array for intercepting the sun's radiation, a compression element positioned substantially perpendicular to the array, and pairs of cables running from opposite sides of the array to the compression element to stabilize the solar elements.

Another aspect is directed to a solar collector comprising solar elements, means for connecting the solar elements to form an array; a compression element positioned substantially perpendicular to the array, and means for stabilizing each solar element with cables running between the array and the compression element.

Yet another aspect is directed to a solar collector comprising solar elements, means for connecting the solar element to form a substantially parabolic array, a compression element positioned along the single axis of symmetry of the parabolic array, and means for stabilizing each solar element with cables running between the parabolic array and the compression element.

Still another aspect is directed to a solar collector comprising a solar element, a compression element positioned substantially perpendicular to the solar element, and a pair of cables connected to opposite sides of the solar element, wherein the pair of cables further connect to the compression element to strengthen the solar element.

BRIEF DESCRIPTION OF DRAWINGS

The foregoing and other aspects and advantages of the invention will be apparent from the following detailed description of the invention, as illustrated in the accompanying drawings, in which.

DETAILED DESCRIPTION OF THE INVENTION

FIGS. 2-5 illustrate a solar collector 20 according to the present invention. Solar collector 20 comprises solar elements 22, connectors 24, cables 26 and a compression element 28. Solar elements 22 may be mirrors for reflecting, redirecting and/or concentrating electromagnetic radiation from the sun. The mirrors may be flat, curved or Fresnel mirrors. Alternatively, solar elements 22 may be photovoltaic elements for capturing the sun's radiation and converting it into electricity. Solar element 22 may be tailored to respond to any of the wide range of electromagnetic radiation (EMR) that is emitted by the sun. Each individual solar element 22 acts itself as a solar collector. Individual solar elements 22 are connected together using connectors 24 to form an array 30 of the solar elements. Array 30 is constructed to define a large surface area that can efficiently intercept the sun's radiation. Connectors 24 are configured to hold the edges of solar elements 22 securely, yet the connectors are designed to have minimal impact on reducing the overall active surface area of array 30. Connectors 24 may be positioned anywhere along the edges of solar elements 22, but are preferably located at the corners of the solar elements. Connectors 24 are made of strong, light-weight materials such as aluminum, plastics, composites, etc. Compression element 28 is positioned substantially perpendicular to surface of the array and preferably passes through substantially the center of array 30. Compression element 28 may take the form of a rod or other modified elongated rigid element. Pairs of cables 26 connect from opposite sides of connector 24 to opposite ends of compression element 28. Together each pair of cables 26 mutually stabilizes that portion of the array to which the cables connect.

The size and shape of each collector 20 is dictated by the size, shape and number of solar elements 22 used to build array 30. Typically solar elements 22, such as mirrors and photovoltaic cells, are manufactured as flat panels. The shape of these panels can be any shape, i.e., rectangular, square, hexagonal, etc. The exact size and number of panels used to build array 30 depend on the application of solar collector 20. For the embodiment illustrated in FIGS. 2-5, array 30 is fabricated using sixteen solar elements 22, each a square panel. The tension and compression system constructed to support this sixteen element array utilizes twenty-one connectors 24 located between the corners of each solar element 22, one compression element 28 and twenty pairs of cables 26 each running from a connector to the compression element. Cables 26 that connect to the perimeter of array 30 are primarily connected closest to the ends of compression element 28. Cables 30 that connect to the interior of array 30 primarily connect inward along compression element 28 as shown in FIG. 3-6. Cables 30 are typically fabricated from high strength aircraft cable wire.

The overall surface shape of each array 30 is dictated by the orientation of each solar element within array 30. If solar collector 20 comprises photovoltaic elements, then a flat surface array is the preferred shape. However, if solar collector 20 comprises reflector elements for focusing the sun's energy to a specific location, then a substantially parabolic array is required. It is noted that for small arcs, spherical arrays can approximate parabolic arrays. For a parabolic array 30, compression element 28 is positioned along the single axis of reflective symmetry of the parabolic array. Adjustment of the focus of each solar element 22 is accomplished by moving tension elements (a.k.a. cables) along the length of compression element 28. When cables 26 from the outer portions of array 30 are moved closer to the end of compression element 28, they tilt the reflective surface of mirrors towards the compression element and shorten the focus of these mirrors.

The use of cables and connectors to support solar elements 22 results in only a modest decrease in the active area of array 30. Cables 26 are thin and connectors 24 cover just a small portion of the edges of each element 22. The resulting decrease in solar radiation imparted to solar elements 22 is only about 1-2% of their total surface area.

Figure 7:
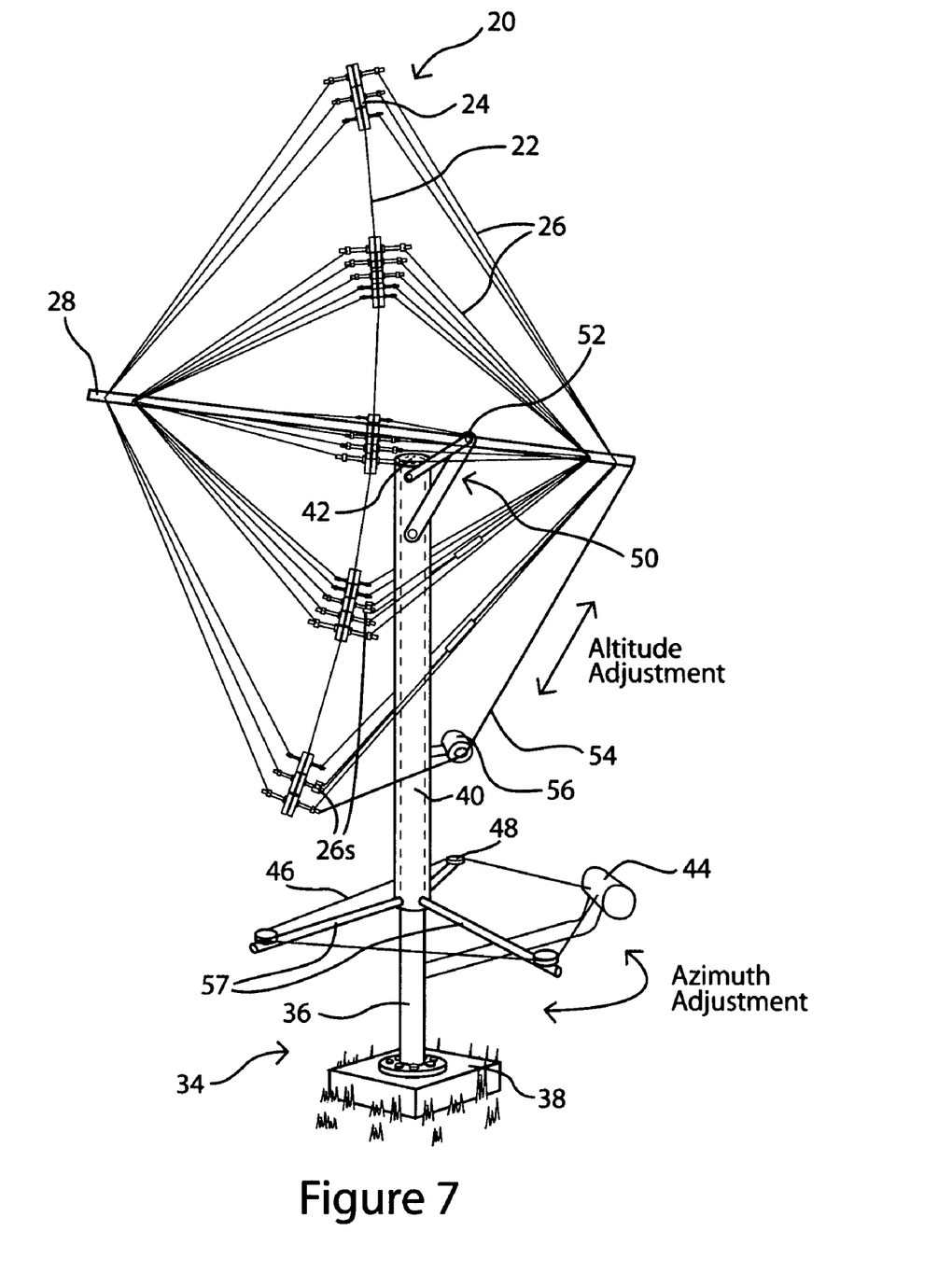
FIG. 7 is a side perspective view of the support structure and drive mechanism for aligning and tracking the solar collector in FIG. 2 to the sun.

A support structure 34 is used to secure array 30 relative to a fixed structure such as the ground or a building. As shown in FIG. 7, support structure 34 comprises a post 36 with the bottom end of the post driven into the ground or attached to a foundation 38. Over and around post 36 is positioned a tube 40. Tube 40 may have a closed end 42 that rests on top of the top end of post 36. Tube 40 may alternatively be supported near the base of post 36 or anywhere else along the length of the post. Tube 40 is configured so that it can freely rotate around post 36 giving a first axis of rotation for azimuth control of array 30. The azimuth is controlled by azimuth motor 44, azimuth cables 46 and azimuth pulleys 48 near the bottom of tube 40. Proximate the top of tube 40 is secured a pivot assembly system 50 that interfaces to support compression element 28 and associated array 30. Compression element 28 is attached at pivot 52, which is located at approximately a 45-degree angle from the top of tube 40. Pivot 52 is located behind the solar-facing side of array 30. Compression element 28 rotates relative to pivot 52. An altitude adjustment cable 54, driven by altitude motor 56, may extend from one end of compression element 28 to the opposite end of the compression element around a pulley connected to the base of array 30. Alternatively, altitude adjustment cable 54 may extend from one end of compression element 28 to a connector 24 of array 30. Altitude motor 56 can adjust the altitude of array 30 relative to pivot 52 giving the second axis of rotation to provide altitude control of array 30. This altitude system allows for zero degree to ninety plus degree altitude adjustment. Altitude adjustment cable 54 in combination with altitude motor 56 securely holds array 30 in place. Cables 26 on the non-solar facing side of array 30, along the lower vertical center line of the array, should be offset or split into two cables 26s at connector 24 so they do not interfere with the altitude control for the array. An electronic control unit is further integrated with azimuth motor 44 and altitude motor 56 to regulate tracking with the sun. The electronic control may incorporate sensors for determining the location of the radiation source or be preprogrammed to track for a given location or time of year. The solar collector system may also use other conventional drive systems to track with the sun.

Figure 6:
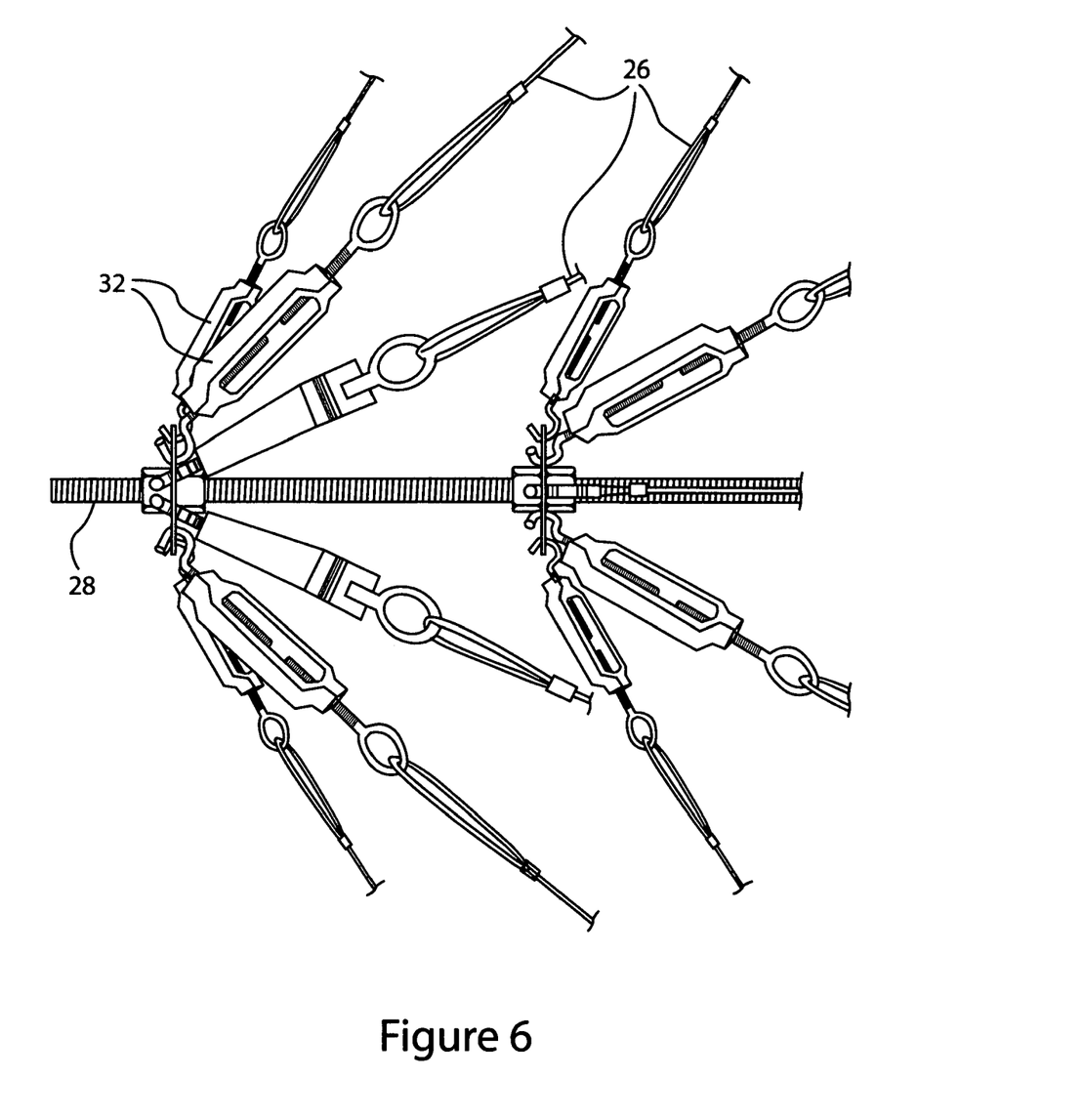
FIG. 6 is a side perspective view of one end of a compression element illustrating a structure according to the present invention for attaching cables to the compression element.

Together compression element 28 and cables 26 form a tension compression system. Each cable 26 may be fitted with a tension adjuster 32 that allows for independent adjustment of the tension within each cable as shown in FIG. 6. Alternatively, groups of cables all connected at the same location along compression element 28 may be moved together to adjust tension for the group of solar elements 22 connected at that point. Cables 26 all connected at a given point along compression element 28 have the same length between array 30 and the compression element. Stabilization of each portion of the array occurs by balancing the tension between each pair of cables. When array 30 is assembled, cables 26 are pre-tensioned to stabilize the array. Pre-tensioning cables 26 prevents either of the cables from becoming slack or loose when external forces are applied to the system. Once the tension and compression system is properly stabilized any external force imparted on to solar elements 22 is equalized within each pair of cables and transmitted to compression element 28. For example, when wind imparts a force on to array 30, the complimentary cables 26 on each side of array 30 keep the shape of the array fixed and allow the force of the wind to be transferred to compression element 28 and to post 36.

Figure 8A:
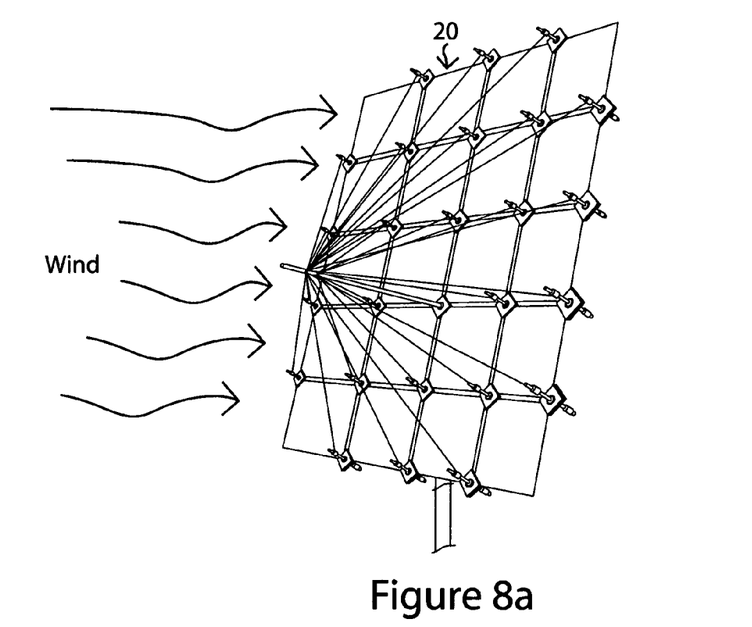
FIG. 8a is a side perspective view of a solar collector according to the present invention put under the forces of a high wind.
Figure 8B:
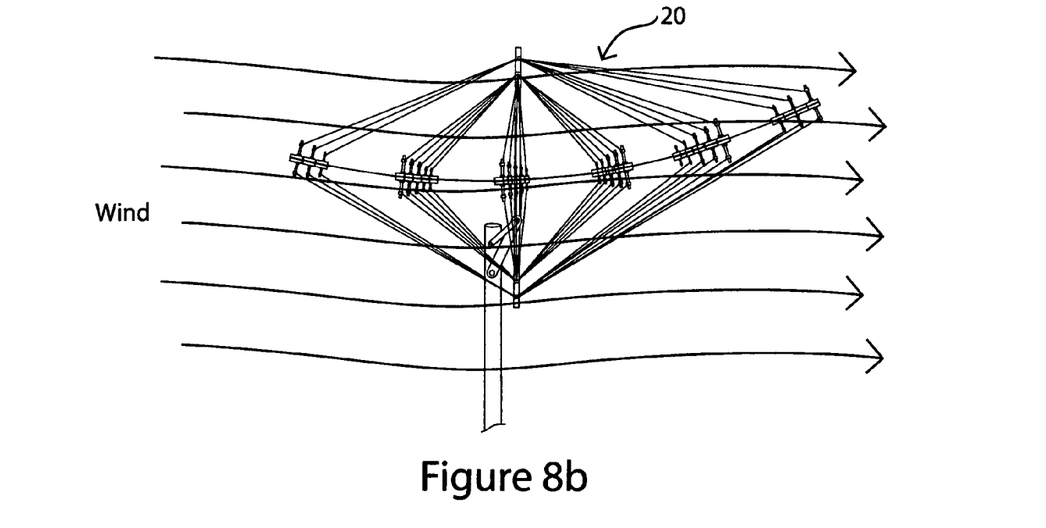
FIG. 8b is a side perspective view the solar collector in FIG. 8a furling in response to the high wind.

Solar collector 20 may be modified to provide it with the capability of furling under high winds as shown in FIGS. 8*a* and 8*b*. Furling is advantageous since the force imposed by the wind on a horizontal array is approximately ten percent of that for a vertical array. This furling capability allows solar collector 20 to be designed for smaller wind loads, which in turn provides substantial fabrication savings. One approach to providing solar collector 20 with furling capabilities is to provide array 30 with an additional row of solar elements 22 at the top of the array. A four-by-five panel array creates an unbalanced area. When wind blows against array 30, the wind will push with a greater force above compression element 28 than below the compression element. This unbalanced area effect is further enhanced by the natural tendency of the wind's speed to increase with height above the ground. The drive mechanism of altitude motor 56 may incorporate a variety of different types of clutch mechanisms that will allow adjustment cable 54 to disengage and move freely once a certain wind speed is exceeded. Solar collector 20 may further include a mechanism for rotating array 30 when the wind is coming from the behind the solar-facing side of the array. One embodiment includes adding a thin lightweight material or skin over selected cables on the non-solar-facing side of array 30 in combination with a fin on one end of compression element 28. This allows solar collector 20 to act as a weather vane that will rotate along the azimuth and into the wind so that the unbalanced area effect will cause array 30 to furl. Automatic azimuth rotation due to high winds can occur by providing azimuth motor 44 with a clutch mechanism. Azimuth cables 46 are configured to move freely once a certain force imparted by the wind is exceeded. Alternatively, a clutch mechanism can be designed between arms 57 holding the azimuth drive system (44, 46 and 48) and tube 40 so that tube 40 is free to rotate when a certain wind force is exceeded.

Figure 9A:
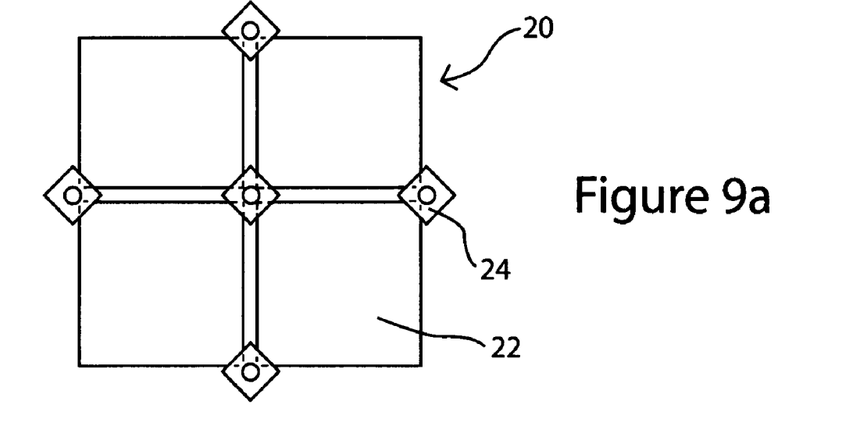
FIG. 9a is a plan view of a first type of connector according to the present invention.
Figure 9B:
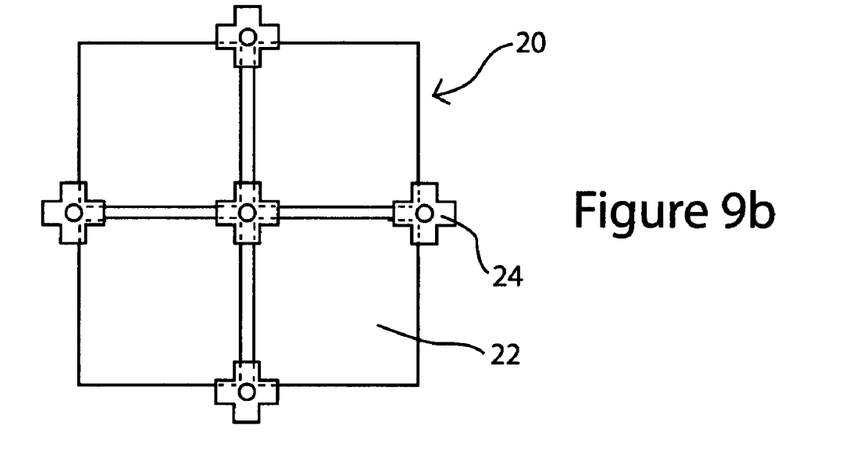
FIG. 9b is a plan view of a second type of connector according to the present invention.
Figure 9C:
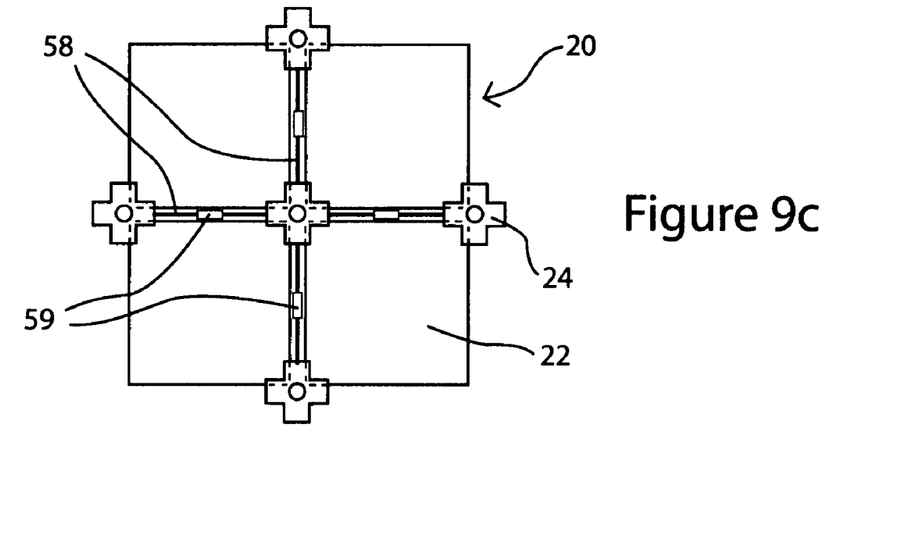
FIG. 9c is a plan view of a third type of connector according to the present invention.

Although the basic structure and principles behind operation of solar collector 20 are defined above, variations can be made to various components without deviating from the scope of the invention. For instance, several different types of connectors can be used as shown in FIG. 9*a-c*. FIG. 9*a* shows connector 24 as a square with slots in each edge to hold a corner of each solar element 22. The connector 24 may be fabricated in two pieces, the bottom layer having a recess to accept the corner of a solar element 22 and another top layer that presses and locks the solar element in place when the top layer is tightened down in place with a fastener. Alternatively, in FIG. 9*b*, connectors 24 may each be cross shaped with slots for holding both the corner and part of the edges of each solar element 22. FIG. 9*c* further adds a compression element 58 between connectors. Compression element 58 may include a compression adjuster 59 for regulating compression/tension within the plane of array 30.

Figure 10A:
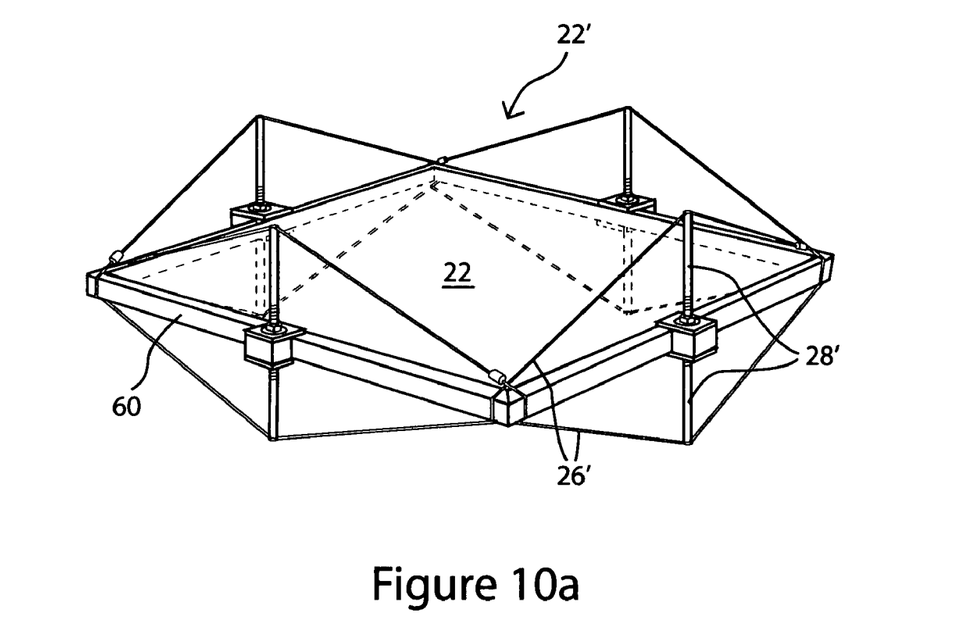
FIG. 10a is a side perspective view of a solar element according to one embodiment of this invention incorporating cables, a frame and compression elements for strengthening and stabilizing the solar element.
Figure 10B:
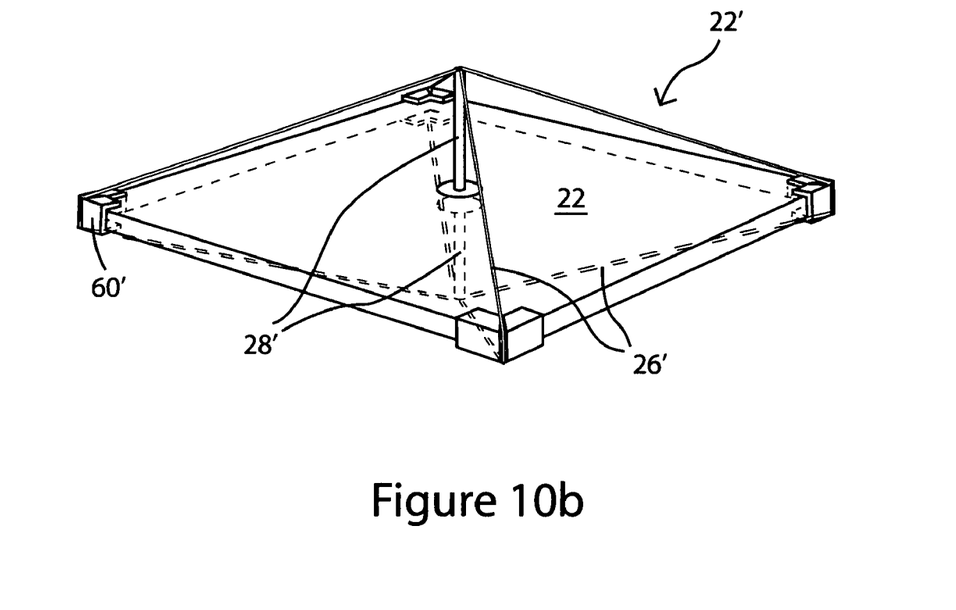
FIG. 10b is a side perspective view of a solar element according to another embodiment of this invention incorporating cables, corner frames and a compression element for strengthening and stabilizing the solar element.

Each solar element 22 may itself be strengthened and stabilized through the use of cables 26' and compression elements 28' to produce a solar element assembly 22' that can be used in place of solar elements 22 described above. The strengthening and stabilizing process may be further used to affect the curvature of each element 22. FIG. 10*a* and 10*b* illustrate two solar element assemblies 22'. Each solar element assembly 22' acts itself as an individual solar collector. Solar element assembly 22' comprises a solar element 22, cables 26' and a compression element 28'. Compression element 28' is positioned substantially perpendicular to solar element 22. Depending on the design, compression element 28' may be positioned at the center of solar element 22, the edge of the solar element, or at an intermediate position between the center and edge of the solar element. Pairs of cables 26' connect from opposite sides of solar element 22 proximate the edge of the solar element and then connect to opposite ends of compression element 28'. Solar element assembly 22' may further include a frame 60 or frame sections 60' along the edges of solar element 22 to which cables 26' connect. Depending on the design, solar element assembly 22' may also include a plurality of pairs of cables 26' and a plurality of compression elements 28'. The compression elements may further comprise two separate compression elements each located on opposite sides of solar element 22.

Figure 11:
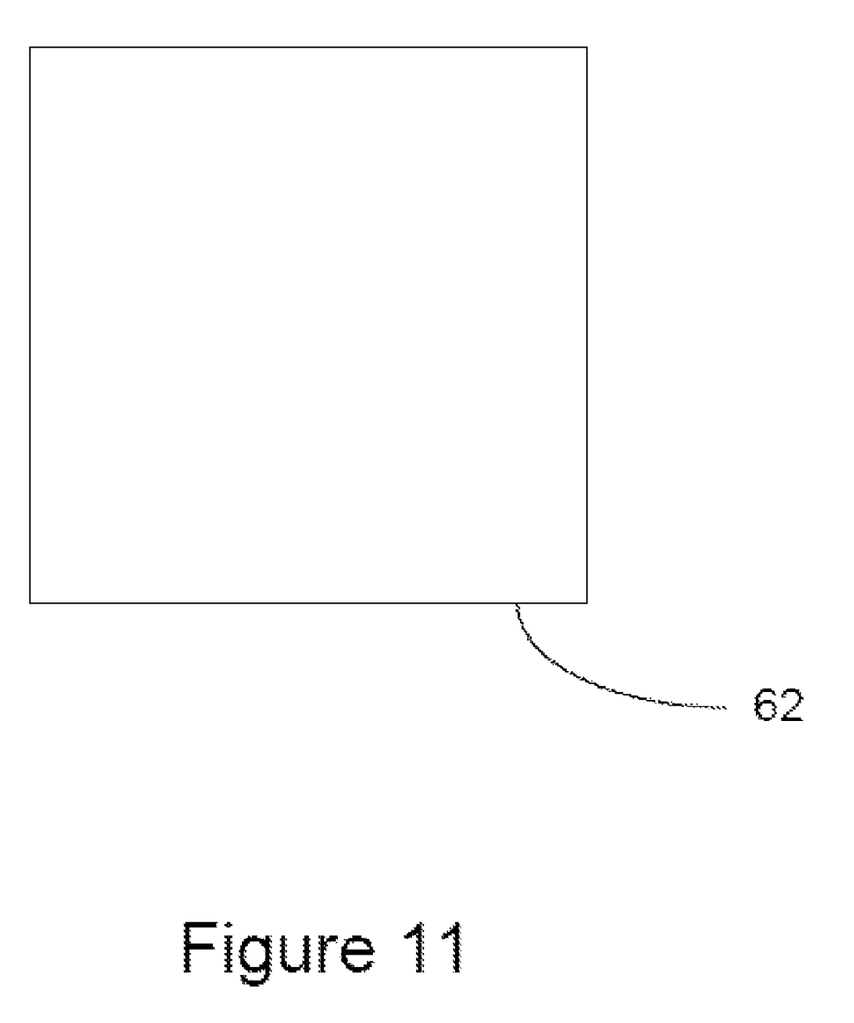
FIG. 11 depicts a solar receiving element for accepting solar radiation redirected by an array according to one embodiment of the present invention.

If solar elements 22 are photovoltaic elements, then array 30 can act as the complete collector system. However if solar elements 22 are reflectors, then a solar receiving element (e.g., solar receiving element 62 as shown in FIG. 11) is required along with collector array 30 to complete the solar collector system. The receiving element may be a photovoltaic element with the sun's radiation concentrated on to it. Alternatively, the receiving element may be a thermal element where a material or subsystem is heated by the sun's concentrated energy. For example, a single array system could be used to heat water for a home. On the other hand a multiple array system, incorporating dozens or hundreds of arrays, could direct all of the solar radiation to heat molten salts to drive a solar power plant.

The key aspects of solar collector 20 defined in this application are the versatility and performance of the system. First, the basic design can be scaled from an array with a surface area of a few square meters to an array having a couple hundred square meters, the only modification being the size of individual components and the number of components used. Second, the invention provides a way to reduce the amount of structural materials required to support solar elements 22. This considerably reduces the weight and cost of the structure. Reducing the weight and cost of the structure to support the solar elements also results in reducing the size and cost of the drive mechanism and auxiliary components needed due to the lower weight and inertia of the system. Third, the invention provides a structure that is inexpensive to ship in disassembled form and that is easy to assemble at the point of installation. Fourth, the structure can be easily mass produced thereby further lowering the cost of the system. Fifth, the invention provides an easy way to change the focal length of the system either during manufacture or at the point of installation. And lastly, the invention provides a system that allows for easy maintenance and replacement of critical components.

The solar collection system defined by the present invention can be extended for use over the complete electromagnetic radiation (EMR) spectra. This may include ultraviolet, optical, infrared, microwaves, radio waves and other astronomic applications. It may also be used to collect EMR from man made sources. Depending on the wavelength of EMR, solar elements 20 may include EMR elements that collect or reflect radiation at any given wavelength. For example, at radio-wave wavelengths wire mesh grids make good reflectors. Solar system 20 works for any application where a large area is required for intercepting and collecting the electromagnetic radiation.

The invention is not limited to the embodiments represented and described above but includes all variants notably those concerning the types of solar elements used to form the solar collector, the manner in which individual solar elements are strengthened, the manner in which individual solar elements are connected and the types of materials used to construct the apparatus. Nothing in the above specification is intended to limit the invention more narrowly than the appended claims. The examples given are intended only to be illustrative rather than exclusive.

What is claimed is:

1. A solar collector comprising:
    a solar element;
    a compression element positioned substantially perpendicular to said solar element; and
    a pair of tensioned cables coupled to a bracket assembly at each corner of said solar element, a first tensioned cable of said pair of tensioned cables further coupled to a fore end of said compression element and a second tensioned cable of said pair of tensioned cables coupled to an aft end of said compression element, said pair of tensioned cables configured to position said solar element with respect to said compression element.

2. A solar collector recited in claim 1, wherein said pair of tensioned cables stabilizes said solar element.

3. A solar collector recited in claim 1, further comprising a plurality of said pairs of tensioned cables connecting from said opposite sides of said solar element to said compression element.

4. A solar collector recited in claim 1, further comprising a plurality of said compression elements.

5. A solar collector recited in claim 1, further comprising a frame on the edge of said solar element.

6. A solar collector recited in claim 1, wherein each said pair of tensioned cables is connected to an edge of said solar element.

7. A solar collector recited in claim 1, wherein the position of said compression element is at least one from the group including the center of said solar element, the edge of said solar element, and an intermediate position between said center and edge of said solar element.

8. A solar collector recited in claim 1, wherein said compression element comprises two separate compression elements each located on opposite sides of said solar element, said first tensioned cable of said pair of tensioned cables runs to the first of said two separate compression elements, and said second tensioned cable of said pair of tensioned cables runs to the second of said two separate compression element.

9. A solar collector comprising:
    solar elements;
    at least one connector configured to connect said solar elements to form an array;
    a compression element positioned substantially perpendicular to said array; and
    a plurality of tensioned cables coupled to an assembly at each intersection of at least two of said solar elements in the array, a first tensioned cable of said plurality of tensioned cables further coupled to a fore end of said compression element and a second tensioned cable of said plurality of tensioned cables coupled to an aft end of said compression element, said plurality of tensioned cables configured to adjust a concavity of said array.

10. A solar collector recited in claim 9, wherein said compression element passes through said array.

11. A solar collector recited in claim 9, further comprising a tension and compression system configured to support said array to a fixed structure.

12. A solar collector recited in claim 9, further comprising a drive system configured to track said array with the sun.

13. A solar collector recited in claim 9, further comprising at least one of an additional row of solar elements, an altitude motor with a clutch mechanism, a skin over selected tensioned cables on a non-solar-facing side of the array, and an azimuth motor with a clutch mechanism configured to furl said array in high winds to minimize the damaging effects of the high wind.

14. A solar collector comprising:
    solar elements connected to form an array for intercepting the sun's radiation;
    a compression element positioned substantially perpendicular to said array;
    a bracket assembly located at each intersection of said solar elements; and
    a plurality of tensioned cables coupled to each bracket assembly, a first tensioned cable of said plurality of tensioned cables further coupled to a fore end of said compression element and a second tensioned cable of said plurality of tensioned cables further coupled to an aft end of said compression element, said plurality of tensioned cables configured to adjust a concavity of said array.

15. A solar collector recited in claim 14, wherein said compression element passes through said array.

16. A solar collector recited in claim 14, wherein said compression element passes through substantially the center of said array.

17. A solar collector recited in claim 14, wherein each said plurality of tensioned cables mutually stabilizes that portion of said array to which each said plurality of tensioned cables connect.

18. A solar collector recited in claim 14, wherein the tension in each said plurality of tensioned cables is adjustable.

19. A solar collector recited in claim 14, wherein said array is at least one from the group including a planar array, a spherical array and a parabolic array.

20. A solar collector recited in claim 14, further comprising a support structure for securing said array to a fixed structure.

21. A solar collector recited in claim 14, further comprising a tracking mechanism for tracking said array with the sun's movement.

22. A solar collector recited in claim 14, wherein each said solar element is at least one from the group including an EMR element, a minor and a photovoltaic element.

23. A solar collector recited in claim 14, further comprising a solar receiving element for accepting solar radiation redirected by said array.

24. A solar collector comprising:
    solar elements;
    at least one connector configured to connect said solar elements to form a substantially parabolic array;
    a compression element positioned along the single axis of reflective symmetry of said parabolic array; and
    a plurality of tensioned cables coupled to an assembly at each intersection of at least two of said solar elements in the array, a first tensioned cable of said plurality of tensioned cables further coupled to a fore end of said compression element and a second tensioned cable of said plurality of tensioned cables coupled to an aft end of said compression element, said plurality of tensioned cables configured to adjust a concavity of said parabolic array.

25. A solar collector recited in claim 24, wherein the compression element is configured to adjust the focal point of said parabolic array.

* * * * *